US012600930B2

(12) United States Patent
      Norris

(10) Patent No.: US 12,600,930 B2
(45) Date of Patent: Apr. 14, 2026

(54) PROCESS FOR AGING DISTILLED SPIRITS

(71) Applicant: Jeremy Norris, Benson, NC (US)

(72) Inventor: Jeremy Norris, Benson, NC (US)

( * ) Notice: Subject to any disclaimer, the term of this patent is extended or adjusted under 35 U.S.C. 154(b) by 439 days.

(21) Appl. No.: 17/336,578

(22) Filed: Jun. 2, 2021

(65) Prior Publication Data

US 2021/0371780 A1      Dec. 2, 2021

Related U.S. Application Data

(60) Provisional application No. 63/033,456, filed on Jun. 2, 2020.

(51) Int. Cl.
     *C12G 3/06*            (2006.01)
(52) U.S. Cl.
     CPC ...................................... *C12G 3/06* (2013.01)
(58) Field of Classification Search
     USPC ........................................................ 426/592
     See application file for complete search history.

(56) References Cited

FOREIGN PATENT DOCUMENTS

WO        2011053405     *  5/2011    .............. C12G 3/12
WO        2012017110     *  9/2012    .............. C12H 1/22

OTHER PUBLICATIONS

Zubaty, Preservation Opens With Links to the Past, May 3, 2018 accessed at https://www.nceda.net/wp-content/uploads/2022/02/PreservationOpensWithLinks ToThePast.pdf (ZUBATY).*

* cited by examiner

*Primary Examiner* — Nikki H. Dees
*Assistant Examiner* — Philip A Dubois
(74) *Attorney, Agent, or Firm* — COATS & BENNETT, PLLC

(57)            ABSTRACT

The present invention relates to a process for producing distilled spirits. After fermentation and distillation, the freshly distilled spirits are placed in wooden barrels and subjected to an initial aging process. Thereafter, the wooden barrels are placed in a tobacco curing and drying barn and aged therein for a selected period of time.

1 Claim, 2 Drawing Sheets

PROCESS FOR AGING DISTILLED SPIRITS

FIELD OF THE INVENTION

The present invention relates to processes for distilling and aging spirits.

BACKGROUND OF THE INVENTION

Some distilled alcoholic beverages are aged for a number of years. Indeed, some are aged for ten years or longer. It is widely accepted that aging freshly distilled spirits enhances the overall quality of the spirits. However, aging distilled spirits for a substantial time is obviously costly. There is the cost of wooden barrels and providing aging facilities where the spirits are stored. Moreover, there is substantial cost associated with the length of time required to earn a reasonable return on investment. There is clearly an economic argument to be made for attempting to streamline the aging process, especially when producers have to focus on being profitable.

Much of the science of aging spirits remains largely theoretical and is constantly changing. Spirit producers have been trying to speed up maturation for decades. There have been many approaches to accelerating the aging process. For example, it is known to soak charred wood chips in the spirits to accelerate the aging process. In addition, it is known to pressurize the spirits in wooden barrels in the hope of accelerating the aging process and achieving quality spirits. Even ultrasound has been employed in an attempt to accelerate the aging process. These are just a few examples of what spirit producers have used in the past in hopes of accelerating the aging process and obtaining a quality distilled spirit that is comparable in quality to those that have been aged for years.

Obtaining a high quality spirit through an accelerated aging process remains challenging. That is, aging a spirit that is smooth, flavorful, and complex in months rather than years is not an easy undertaking. Missing are processes for aging spirits that are bold and unique approaches to aging. As described below, the inventor of the present process for aging freshly distilled spirits has embarked on a novel and inventive way of producing a high quality distilled spirit without the need for years of aging.

SUMMARY OF THE INVENTION

Figure 1:
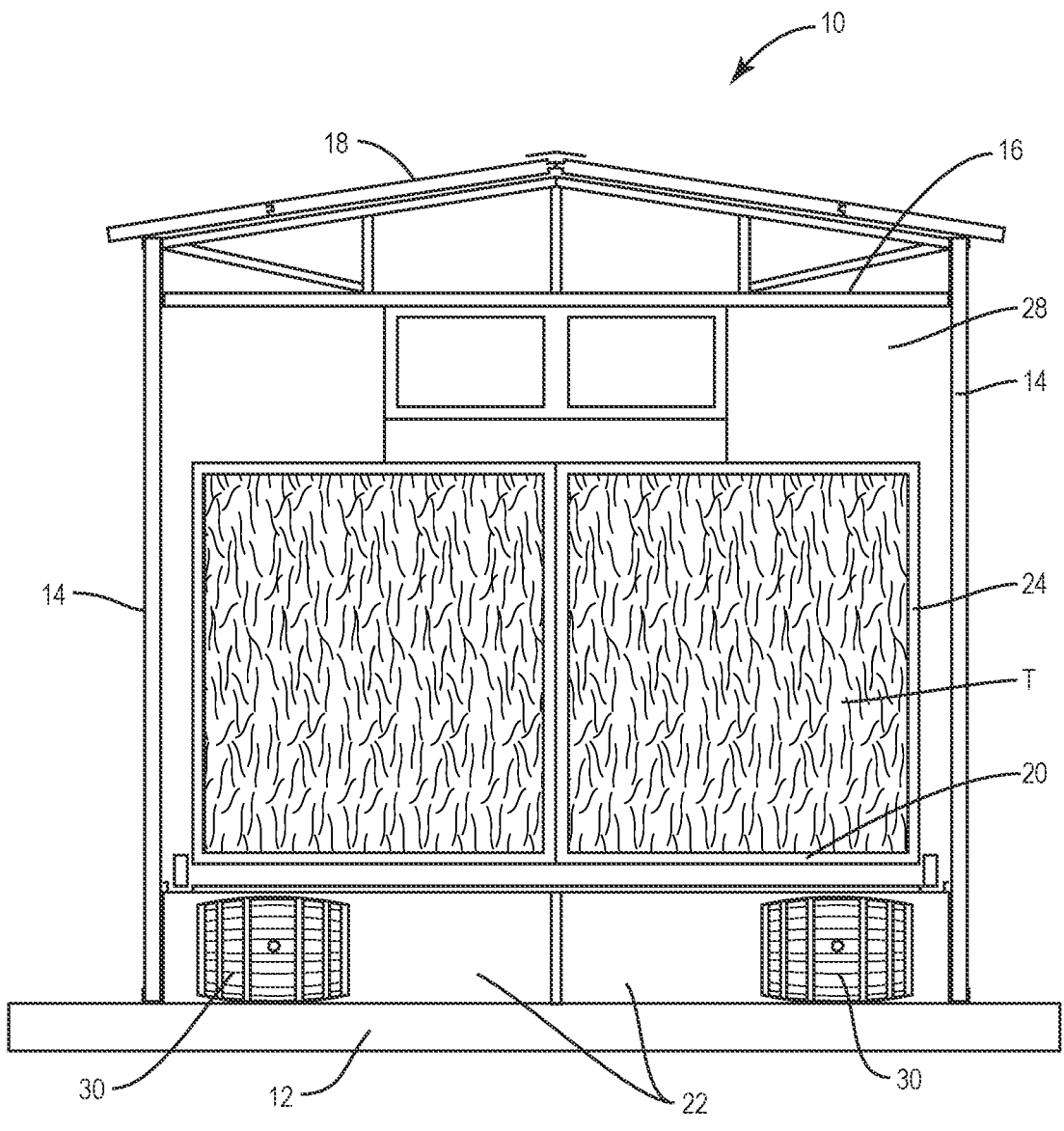
FIG. 1 is a front elevational view of a tobacco barn with the front doors removed and showing barrels of distilled spirits contained in the tobacco barn underneath tobacco contained in the barn.

The present invention relates to a process for producing distilled spirits where during the aging period, wooden barrels (preferably of charred oak) containing distilled spirits are placed for a selected period of time in a tobacco curing and drying barn where the temperature of the barn is maintained at a temperature typically employed in at one phase of a tobacco curing and drying process.

In one exemplary aging process, freshly distilled spirits are placed in oak barrels and aged for approximately one week to approximately six months before being placed in the tobacco curing and drying barn. After this initial aging, the barrels of spirits are placed in a closed tobacco curing and drying barn (sometimes referred to as a bulk tobacco barn). The tobacco barn includes a furnace system that heats air and circulates the air throughout the barn and in and around the barrels of spirits therein. In one example, the temperature in the barn is maintained at approximately 165° F. Time in the tobacco curing and drying barn can vary, but in one embodiment (one example) the barrels of spirits are kept in the tobacco curing and drying barn for approximately 8 to 80 hours.

As discussed more fully below, the spirits in the barrels, after being exposed to the tobacco curing and drying barn, are smooth, flavorful, and complex, and much of the quality of the spirits are attributable to the aging in the tobacco curing and drying barn under these conditions.

The object of the process disclosed herein is to provide an accelerated aging process for producing an alcoholic beverage where the color, flavor, and complexity is substantially similar to that of a mature oak-aged alcoholic beverage that has been aged for years.

In one embodiment, there is disclosed herein a process for aging distilled spirits in a tobacco curing and drying barn. This process entails containing the distilled spirits in wooden barrels, such as oak barrels, and subjecting the distilled spirits to an initial aging process for a selected period of time. After initially aging the distilled spirits in the wooden barrels, the distilled spirits are aged in a tobacco curing and drying barn by placing the wooden barrels containing the distilled spirits into the tobacco barn that has previously been used to cure and dry tobacco. The process then includes circulating a heated system of air through the tobacco curing and drying barn and directing the heated system of air into contact with barrels containing the distilled spirits. This process is continued for a selected period of time by continuing to circulate the heated system of air through the tobacco curing and drying barn and contacting the wooden barrels containing the distilled spirits.

In another embodiment, the process entails aging distilled spirits in a tobacco drying environment. This process includes containing the distilled spirits in wooden barrels, such as oak barrels. The distilled spirits in the wooden barrels are subjected to an initial aging process. After the initial aging process, the wooden barrels containing the distilled spirits are placed in a tobacco drying barn. The tobacco drying barn is loaded with green and undried tobacco. The process entails aging the distilled spirits in the wooden barrels in the tobacco drying barn while the tobacco therein is being dried. This process includes circulating a system of heated air through the tobacco barn and contacting the wooden barrels containing the distilled spirits with the system of heated air and at the same time contacting the tobacco and drying the tobacco therein. Hence, the distilled spirits in the wooden barrels are aged while in the tobacco drying barn and while the tobacco therein is being cured.

Other objects and advantages of the present invention will become apparent and obvious from a study of the following description and the accompanying drawings which are merely illustrative of such invention.

DESCRIPTION OF EXEMPLARY EMBODIMENT

The present invention relates to a process for producing distilled spirits but focuses on aging the distilled spirits. As noted above, one phase of the aging process subjects the freshly distilled spirits, contained in oak barrels, to a tobacco curing and drying barn environment. This phase of the aging process enhances the overall quality of the distilled spirits. What was found in testing is that the aging that takes place in the confines of a tobacco curing and drying barn at typical tobacco drying temperature (approximately 165° F.) enhances complexity and improves the taste, flavor, smoothness, and color of the distilled spirits.

Typically and traditionally, the production of mature oak-aged alcoholic beverages suitable for human consumption, such as whiskey, bourbon, scotch, rum, or tequila, includes the processes of fermentation and distillation followed by aging in oak barrels at natural ambient conditions for suitable periods of time. As people skilled in the art appreciate, the basic processes of fermentation and distillation are known. There are many versions of the fermentation process, as well as specific ways in which distillation is carried out. Hence, a detailed discussion of the fermentation and distillation process is not described here. It should be pointed out, however, that the aging process described hereafter and particularly the phase of the aging process where oak barrels are subjected to a tobacco curing and drying barn environment are applicable to any particular fermentation or distillation process.

Still a brief discussion of fermentation and distillation is appropriate. Generally, the production of spirits begins with taking grain (wheat, corn, or rye) and grinding it into a meal which is cooked. Sometimes the production of spirits begins with products from sugarcane, such as the production of rum. Malt and sugar are often added. This produces what is referred to as a mash that is cooled and placed in a fermenter where yeast is added. After a selected period of time, the fermented mixture is heated in a still where the heat vaporizes the alcohol. The alcohol vapors are caught, cooled, condensed, and drawn off as a clean, freshly distilled spirits. This, of course, is a general description of fermentation and distillation. As noted above, there are many variations to fermentation and distillation.

Now we will turn to the aging process of the freshly distilled spirits. Aging simply means allowing the freshly distilled spirits to mature. This is often referred to as "maturation." The term "aging" is used herein in a broad sense. The term "aging" does not imply an extremely long period of time, such as one or two years or even longer. Aging freshly distilled spirits can be done in a relatively short period of time, especially compared to spirits that are aged for years.

Aging begins with placing the freshly distilled spirits in charred oak barrels or some other container, preferably made of some type of wood. The oak barrels are placed in a building where the temperature of the building varies depending upon the season and climate. The filled oak barrels are left in the building for a selected period of time. This period of time can vary depending on the nature and type of the freshly distilled spirits and the climate. It may be as short as weeks or as long as months. In a preferred process, the spirit filled oak barrels are aged approximately six months. This process is referred to herein as an initial aging process.

After this initial aging, the oak barrels are moved into a tobacco curing and drying barn. Today, most tobacco curing and drying barns are of the "bulk curing type." That is, freshly harvested tobacco leaves are contained or supported in a bulk rack or bulk container in the barn. These tobacco curing and drying barns include a forced air furnace, typically gas fired, which is contained in a rear portion of the barn. Air is circulated (typically by a blower forming a part of the furnace) through the furnace and heated to maintain a select temperature in the barn. That is, heated air leaves the furnace and moves vertically through the tobacco contained in the barn and thereafter returns to the furnace. Some moisture-laden air is exhausted from the barn. Air is continuously circulated through the barn during the curing or drying process. This is an overview of bulk tobacco curing and drying barns. For a more complete and unified understanding of tobacco curing and drying barns and the curing and drying process, one is referred to the disclosures in U.S. Pat. Nos. 4,136,465 and 3,948,553, the disclosures of which are expressly incorporated herein by reference.

In a preferred embodiment, after the initial aging, the oak barrels are placed in a tobacco curing and drying barn and maintained therein a selected time period during a phase of the tobacco curing and drying process. That is, the oak barrels having the distilled spirits therein occupy the same space in the tobacco curing and drying barn as the tobacco being cured and dried. Hence, the distilled spirits in the oak barrels are being subjected to a unique aging environment while a tobacco curing and drying process is occurring around them. There are various phases of curing and drying tobacco. Initially, the tobacco is subjected to what is often called "yellowing". This is sometimes referred to as the "curing" part of the total process. It is carried out at a relatively low temperature. The second phase is referred to as a leaf drying phase. Here the temperature in the barn is increased from the yellowing temperature and for a period of time the process focuses on drying the leaves of the tobacco. The third and final phase of the curing and drying process is directed at drying the stems of the tobacco leaves. This is often referred to as the "killing out" phase. In this phase, the temperature within the barn is approximately 165° F.

The preferred aging process is to place the oak barrels in the tobacco curing and drying barn at the start of the last phase of curing and drying the tobacco. This means that the oak barrels of distilled spirits are subjected to a temperature of approximately 165° F. in the barn, as well as the circulation of moisture-laden air produced in the course of drying the tobacco. The time periods that the oak barrels are kept in the barn at this temperature can vary. In a number of experiments conducted, the residence time for the oak barrels in the barn range from 16 to 80 hours.

The aging of the distilled spirits in the oak barrels in a tobacco curing and drying barn does not necessarily have to coincide with a tobacco curing and drying process. Mature tobacco curing and drying barns reek with the aroma and smell of tobacco. Over time the moisture-laden air that circulates during the tobacco curing and drying process permeates the barn and its structure. In this example, the spirit filled oak barrels are placed in the tobacco curing and drying barn in the absence of tobacco. The furnace is fired and heated air is circulated through the barn and in and around the oak barrels. The tobacco aroma still present in the barn blends with the system of circulating air that continuously contacts the oak barrels. Temperature is maintained at approximately 165° F. for a selected period of time, ranging from 16 to 80 hours. It is hypothesized that the enhanced complexity, smoothness, and flavor discussed above will result from the aging process occurring in a tobacco curing and drying barn even though there may not be tobacco in the barn during the aging process.

After aging in the curing and drying barn, the spirit filled oak barrels may be rested for a relatively short period of time before bottling.

Generally, bulk tobacco curing and drying barns are elongated and include front doors, an elongated curing and drying space, and a furnace room in the back. In many barns, it is not feasible to age the oak barrels underneath the tobacco being cured and dried because there is inadequate space to accommodate the oak barrels. In this case, the oak barrels are typically placed in the front of the barn between the front doors and where the tobacco is contained in the barn. It is contemplated that tobacco curing and drying barns can be designed and built such that there is adequate space in the bottom of the barn, below the tobacco contained there, to house the oak barrels. This will increase the capacity in the bulk curing and drying barn for aging distilled spirits in the oak barrels. With a tobacco curing and drying barn specifically designed to accommodate spirits aging, this will also give tobacco farmers an additional income stream derived from the spirit manufacturers renting space for aging their spirits.

Figure 2:
FIG. 2 is a side elevational view of the tobacco barn with portions removed to illustrate the aging process.

Shown in FIGS. 1 and 2 is a tobacco curing and drying barn indicated generally by the numeral 10. Barn 10 is specifically designed to hold tobacco and to cure and dry green or undried tobacco. In addition, barn 10 is specifically designed to house an array of barrels containing distilled spirits, indicated by the numeral 30 in the barn. It is noted that the specific design of a tobacco curing and drying barn can vary and still be designed to receive wooden barrels containing distilled spirits.

A detailed description of the tobacco barn 10 is not presented here because tobacco barn structures and tobacco curing and drying processes are known. However, a general description of a tobacco barn and how they can be used for aging distilled spirits may be helpful. With particular reference to FIGS. 1 and 2, tobacco barn 10 is shown. Tobacco barn 10 in this embodiment includes a concrete pad 12 and a frame structure extending upwardly therefrom. The frame structure includes side walls 14, longitudinally spaced roof trusses 16 and a roof 18. Provided near the bottom of the barn 10 is an air distribution floor 20. Air distribution floor 20 is a perforated floor that enables air to pass therethrough. The air distribution floor 12 defines an underlying air plenum 22. As seen in FIGS. 1 and 2, there is an array of barrels 30 disposed in the air plenum 22. Over the air distribution floor 20 is a space for receiving containers 24 that include an open bottom and an open top and which are designed to contain tobacco T to be cured and dried. See FIGS. 1 and 2. In particular, there is shown a plurality of racks or containers 24 for holding the tobacco that is cured and dried in barn 10. In the rear portion of the barn 10 is furnace room 28. The furnace room 28 includes a furnace system 26 that typically includes a fan or blower and a heating unit for heating air passing through the furnace. Furnace room 28 includes a forward wall that includes a lower opening to the plenum 22 and one or more upper openings to accommodate air return.

When tobacco is being cured and dried, the furnace system 26 generates a system of warm or hot air that is directed down into the air plenum 22. The heated air moves from the furnace room towards the front of the barn 10. As the air moves down the plenum 22, the air will contact the barrels 30 which contain the distilled spirits. In addition, the heated air will turn upwardly and move through the air distribution floor 20 into the area occupied by the containers or racks 24 holding the tobacco T. The heated air is generally uniformly distributed upwardly through the space occupied by the tobacco T. Once the air reaches an area above the tobacco T, the air will be laden with moisture. Some of the moisture laden air is exhausted from the barn while another portion is returned to the furnace room where it is again heated and recycled through the barn.

In this process, the moisture laden air passing through the plenum 22 contacts the barrels 30 containing the distilled spirits. This process is continuous during the aging process.

Again, the process described immediately above is a process where the aging takes place during the actual curing and drying of the tobacco. As pointed out above, the present invention also envisions aging the barrels in a tobacco barn where the curing and drying of the tobacco does not take place. In that process, the system of air, heated or unheated, generated by the furnace 26 is directed through the air plenum 22, contacting the barrels 30 in the process, and thereafter being returned through the open space that would contain the tobacco if there was tobacco in the barn being cured and dried.

Tests have been conducted to assess the impact of tobacco barn aging on the overall quality of spirits. First, a batch of freshly distilled spirits was aged in an oak barrel for approximately six months. After aging for six months, the batch was split into first and second batches. The first batch was not subjected to aging in the tobacco curing and drying barn. Only the second batch was subjected to aging in the tobacco curing and drying environment. This aging lasted for approximately 16 hours at a temperature of 165° in a tobacco curing and drying environment within the barn. There was a clear and substantial difference in color between the first and second batches. The second batch had a much darker and richer color. The first and second batches were also subjected to a blind tasting to assess overall quality. The blind testing unanimously concluded that the second batch subjected to the tobacco curing and drying environment was of a much higher overall quality than the first batch, inasmuch as the complexity, flavor, and taste of the second batch was superior to the first batch.

Furthermore, the second batch, aged in the tobacco barn, was compared in a blind tasting with a costly premium spirit that had been aged ten years. Half of the participants in the blind tasting found that the overall quality of the tobacco barn aged spirit exceeded or was equal to the overall quality of the premium spirit that had been aged ten years.

It is hypothesized that a number of factors contribute to the enhanced quality realized through the tobacco barn aging process. The 165° F. tobacco drying temperature heats the spirits in the oak barrels disposed in the barn. This decreases the viscosity of the spirits, causing the spirits to become thinner. At the same time, pressure increases in the oak barrels. This gives rise to some evaporation in the barrels. This expands the oak that forms the barrels. This allows the spirits to soak further and faster into the oak. During this time, the exterior of the oak barrels is subjected to the tobacco curing and drying environment. Air, laden with moisture and tobacco aroma, is circulated over and around the oak barrels for extended periods of time. The expanded oak absorbs the strong tobacco aroma in the circulating air, as well in some cases the moisture being driven from the tobacco leaves. The oak is essentially impregnated with this strong and robust tobacco aroma continuously for extended periods of time. This aroma from the tobacco curing and drying barn, coupled with the oak barrels, gives rise to a unique oak and tobacco complexity that produces a distilled spirit that is complex, smooth, and flavorful and which can include the distinctive tobacco tones.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A process for aging distilled spirits in a tobacco curing and drying barn, comprising:

containing the distilled spirits in wooden barrels;

subjecting the distilled spirits to an initial aging process for a selected period of time;

after initially aging the distilled spirits in the wooden barrels, aging the distilled spirits in a tobacco curing and drying barn by:

placing the wooden barrels containing the distilled spirits into the tobacco curing and drying barn that has previously been used to cure and dry tobacco;

circulating a heated system of air through the tobacco curing and drying barn;

directing the heated system of air into contact with the wooden barrels containing the distilled spirits;

continuing to age the distilled spirits in the wooden barrels for a selected period of time by continuing to circulate the heated system of air through the tobacco curing and drying barn and contacting the wooden barrels containing the distilled spirits;

wherein tobacco is contained in the curing and drying barn and the tobacco is cured or dried while the distilled spirits are being aged in the tobacco curing and drying barn; and placing the wooden barrels of distilled spirits in a front portion of the curing and drying tobacco barn opposite a furnace system disposed in a rear portion of the curing and drying barn, and wherein the tobacco being cured and dried is disposed between the wooden barrels containing the distilled spirits and a back furnace room containing the furnace system.

* * * * *